United States Patent
Nowell

[15] 3,679,964
[45] July 25, 1972

[54] OVER-CURRENT DETECTOR
[72] Inventor: John R. Nowell, Phoenix, Ariz.
[73] Assignee: Honeywell Information Systems Inc., Waltham, Mass.
[22] Filed: Oct. 4, 1971
[21] Appl. No.: 186,122

[52] U.S. Cl.....................................323/9, 321/11, 321/14
[51] Int. Cl......................................H02h 7/12, H02m 3/32
[58] Field of Search...................321/2, 11, 14; 323/9, 22 SC

[56] References Cited
UNITED STATES PATENTS
3,470,449  9/1969  Risberg..................................321/11
3,526,823  9/1970  Genuit..................................321/11 X Primary Examiner—A. D. Pellinen
Attorney—Lloyd B. Guernsey et al.

[57] ABSTRACT

An over-current detector monitors the current delivered by a switching regulator and provides a signal for disabling the switching regulator when the current exceeds a threshold value. The threshold value is determined by the value of the output voltage from the switching regulator.

10 Claims, 4 Drawing Figures

INVENTOR.
JOHN R. NOWELL
BY Lloyd B. Guernsey
AGENT

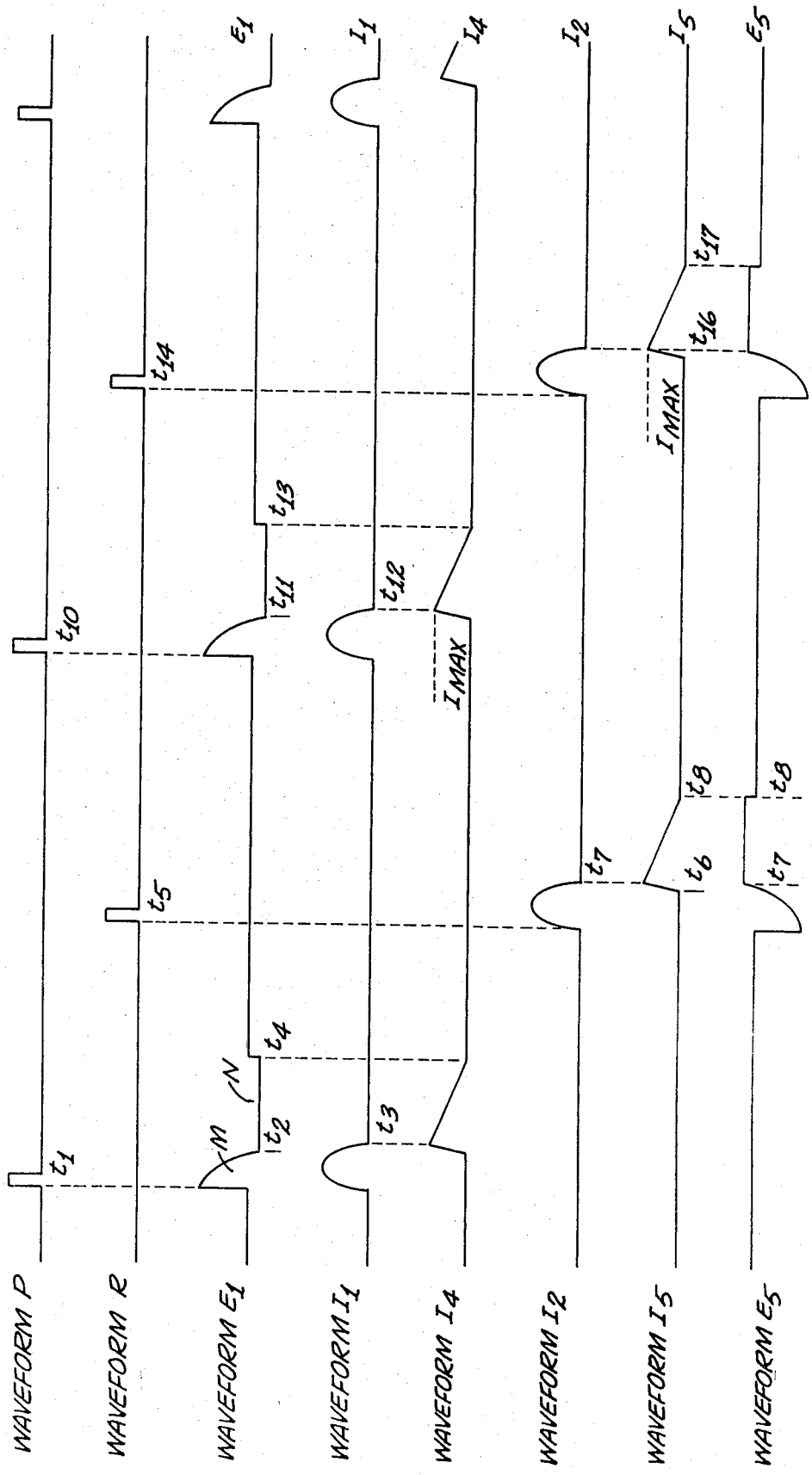

OVER-CURRENT DETECTOR

BACKGROUND OF THE INVENTION

This invention relates to switching regulators and more particularly to over-current detectors which monitor the current delivered by a switching regulator and provide a signal for disabling the regulator when the current exceeds a threshold value.

In high speed data processing systems, microcircuits are used to reduce the physical size of the system and to increase the operating speed. These microcircuits are built in modules each of which may replace a large number of circuits using discrete circuit components. Each of these microcircuit modules requires as much power as several circuits using discrete components so that the power required in a single cabinet of a data processing system using microcircuit modules is several times as large as the power required in a single cabinet using discrete components when the two cabinets have the same physical size. In addition, high speed microcircuits usually use a much smaller value of D.C. voltage than circuits employing discrete components. For example, in many high speed microcircuits the required D.C. voltage may be less than 1 volt. This voltage must be well regulated to provide a constant value of D.C. for the microcircuits, otherwise variations in D.C. voltage may produce error signals in the data processing system.

The power supplied to any system is the product of the voltage and current so that a power distribution system must supply either a large value of current at a relatively small value of voltage or a smaller value of current at a relatively large value of voltage in order to provide a large amount of power. In prior art power supplies, power from a 220 volt A.C. line is converted into relatively small values of D.C. voltage and large amounts of current are distributed by large conductors or "bus" bars to various portions of the data processing system. The voltage drop in each bus bar is proportional to the amount of current in the bus bar so that the value of voltage supplied to each portion of the data processing system varies as current supplied in that portion varies. This variation in voltage may produce error signals in the data processing system.

Another disadvantage of the prior art power supplies is that the efficiency of the supplies is very low. These power supplies usually include a constant voltage transformer, a rectifier which converts the A.C. voltage to a D.C. voltage, and a series regulator which reduces the D.C. voltage to a small but constant value. In such a system the voltage drop in the constant voltage transformer, the rectifier and the series regulator is usually about 5–6 volts, while the output voltage necessary for the microcircuits may be as low as one volt. This means that the power transformer must deliver approximately six to seven times the power which is used by the microcircuit so that the over all efficiency of the power supply is less than 20 percent, thereby causing the power supply to be bulky and expensive. Because of the large size, these power supplies are usually located in a separate cabinet and require long bus bars to distribute the current to other portions of the data processing system. These long bus bars cause severe variations in voltage when current in the bus bar varies. Still another disadvantage of the prior art power supplies is that an excessively large value of current drawn from the power supply can cause damage to the series regulator and other parts of the power supply. Also, a short circuit in the series regulator may cause a large value of voltage to be supplied to the microcircuit modules. This large value of voltage can cause damage to the microcircuits.

A power supply system employing switching regulators and switching regulator control circuits alleviates the disadvantages of the prior art by converting an A.C. voltage to a relatively large value of unregulated D.C. voltage at a plurality of locations in the data processing system. This relatively large value of unregulated D.C. voltage can be converted to a relatively small value of D.C. voltage by the switching regulators at the various locations in the data processing system. The switching regulator has an efficiency which is several times the efficiency of prior art power supplies employing series regulators thereby causing the physical size of the switching regulator to be relatively small and allowing the switching regulator to be positioned near the microcircuit modules.

The switching regulator may employ a transformer, a pair of silicon controlled rectifiers and a source of signals to convert an unregulated D.C. voltage, such as 150 volts, to an accurately regulated voltage, such as 1 volt. The silicon controlled rectifiers are employed as switches between the source of unregulated D.C. voltage and the transformer. The silicon controlled rectifiers are located on the "high" voltage side of the transformer where the current and power losses in these rectifiers are low, thereby causing the switching regulator to have a high degree of efficiency. The regulated D.C. voltage obtained from a secondary winding on a transformer is supplied to a pair of voltage-output terminals. The transformer provides isolation between the regulated D.C. voltage and the source of unregulated D.C. voltage so that a short circuit in a silicon controlled rectifier will not cause damage to the microcircuit modules which provide the load on the switching regulator.

The silicon controlled rectifier is a semi-conductor device having an anode, a cathode and a gate. The silicon controlled rectifier can be used as an ON-OFF switch which can be turned on in a very few microseconds. Normally, the silicon controlled rectifier cannot conduct current between anode and cathode thereof until a pulse of current larger than a threshold value flows from gate to cathode. If a positive voltage difference exists between the anode and the cathode when a pulse of voltage flows from the gate, the silicon controlled rectifier "fires;" i.e., is rendered conductive and a current will flow from the anode to the cathode. The rate at which the current flow from anode to cathode increases when the silicon controlled rectifier fires must be limited to prevent damage to the rectifier. Once anode-cathode flow commences, the gate has no further control over such current flow. Current flow from anode to cathode in a rectifier can be terminated only by reducing the anode to cathode current below a "holding" or minimum current value. A more detailed description of the operation of a silicon controlled rectifier can be found in the Silicon Controlled Rectifier Manual, 4th edition, 1967, published by the General Electric Company, Syracuse New York.

A signal source is coupled to the voltage-output terminals of the switching regulator and develops trigger signals whose frequency is determined by the value of voltage at the voltage-output terminal. The trigger signals are coupled to the silicon controlled rectifiers in the switching regulator and cause these rectifiers to deliver energy through the transformer to output filter capacitors which are connected to the voltage-output terminal. The signal source senses any change in the value of regulated output voltage and causes a change in the frequency of the trigger signals delivered to the switching regulator. This change in frequency of the trigger signals causes a change in the "duty cycle" of the switching regulator. The duty cycle is a duration of time that energy is delivered to the output filter capacitors compared to the total duration of time between trigger signals. This change in the frequency of the trigger signals and in the duty cycle causes a change in the quantity of energy which the switching regulator delivers to the output filter capacitors so that the voltage at the output terminal returns to the original value.

It is often desirable to monitor the current which a switching regulator delivers to a load and to provide a signal which will disable the regulator when the current delivered exceeds a threshold value. In some systems, it may be desirable that the threshold value of current be determined by the value of the output voltage. For example, when the output voltage is relatively high it may be desired that the threshold value of current be relatively high. When a lower value of output voltage is delivered by the switching regulator a lower threshold value of current may be used. What is needed is an over-current detector whose threshold value of current is determined by the output voltage of the switching regulator. It is desirable for the regulator to deliver a higher value of current to the output filter capacitors when power is initially applied to the switching regulator. This higher initial value of current causes the voltage at the output terminal of the regulator to quickly increase to the regulated value. The over-current detector must be temporarily disabled to prevent shut-down of the switching regulator while this higher initial value of current is being delivered. It is desirable for the over-current detector to disable the switching regulator whenever a short-circuit or fault condition occurs in a load across the voltage-output terminals.

It is, therefore, an object of this invention to provide a new and improved over-current detection circuit for use with a switching regulator.

Another object of this invention is to provide an over-current detector which provides a signal which disables the switching regulator when the current from the regulator exceeds a threshold value.

A further object of this invention is to provide an over-current detector whose threshold value of current is proportional to the voltage delivered by a switching regulator.

Another object of this invention is to provide means for disabling the over-current detector when power is initially applied to the switching regulator.

Still another object of this invention is to provide an over-current detector having a relatively low threshold value of current when a fault condition occurs in the switching regulator.

SUMMARY OF THE INVENTION

The foregoing objects are achieved in the instant invention by providing a new and improved over-current detector for monitoring the current delivered by a switching regulator without decreasing the value of the voltage delivered to a load. The switching regulator delivers a predetermined quantity of electrical energy to an output filter for each time a silicon controlled rectifier in the regulator fires. Each time a silicon controlled rectifier fires a pulse of voltage develops across a secondary winding of the transformer in the regulator. The instant invention senses the value of current delivered to the output filter capacitor by sensing the duty cycle of the voltage pulses across the secondary winding of the transformer.

The instant invention uses the value of the voltage from the switching regulator and the value of the current delivered to the output filter to determine when the switching regulator should be disabled. The instant invention includes means to prevent the over-current detector from disabling the switching regulator when power is initially applied to the regulator. The over-current detector disables the regulator at a relatively low value of current when a fault causes the output voltage to decrease.

Other objects and advantages of this invention will become apparent from the following description when taken in connection with the accompanying drawings.

BRIEF DESCRIPTION OF THE DRAWINGS

FIG. 4 illustrates waveforms which are useful in explaining the instant invention.

DESCRIPTION OF THE PREFERRED EMBODIMENT

Figure 1:
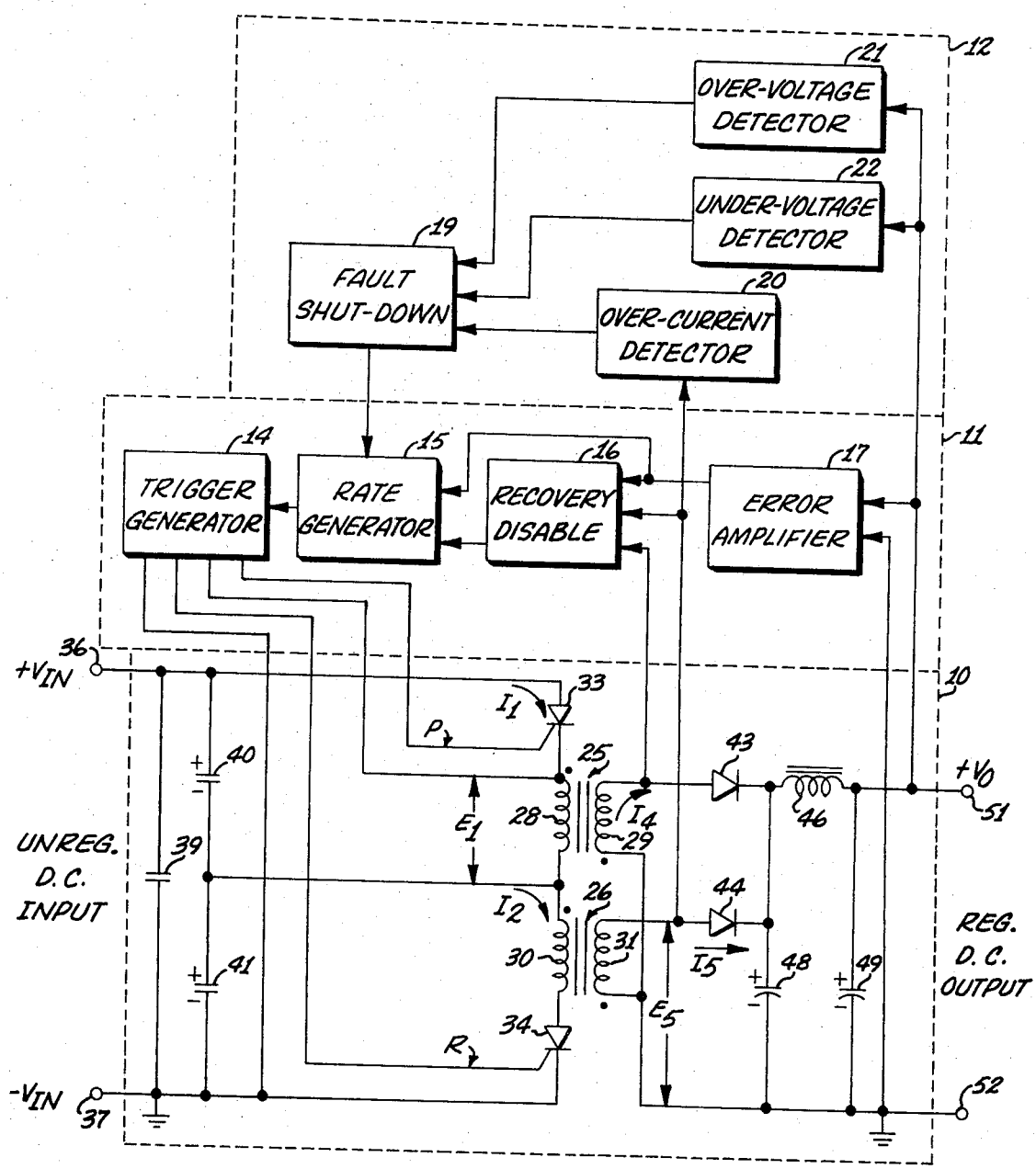
FIG. 1 is a schematic drawing of a switching regulator and its associated control circuits including the instant invention.

Referring more particularly to the drawings by the characters of reference, FIG. 1 discloses a power supply system which is designed to provide a constant supply of D.C. output voltage for a wide range of values of output current and for monitoring the current delivered to a load which may be connected to the system. As indicated in FIG. 1, the system comprises a switching regulator 10, a switching regulator control circuit 11 for providing trigger signals to switching regulator 10, and a circuit 12 for monitoring the current and the voltage delivered by the power supply. The switching regulator control circuit 11 comprises a trigger generator 14, a rate generator 15, a recovery disable circuit 16 and an error amplifier 17. The error amplifier 17 detects any change in voltage at the output terminals of the switching regulator and provides a signal whose value is determined by the change in the output voltage. The signal from the error amplifier 17 causes the rate generator 15 to develop pulses having a frequency which is determined by the value of the signal from the amplifier 17. Pulses from the rate generator cause the trigger generator 14 to develop trigger pulses for the switching regulator. The recovery disable circuit 16 senses the time that output current is being delivered by the switching regulator to the output filter capacitors and prevents a rate generator from delivering pulses during the time that the current is being delivered.

The circuit 12 for monitoring includes a fault shutdown circuit 19, an over-current detector 20, an over-voltage detector 21 and an under-voltage detector 22. The over-current detector 20, the over-voltage detector 21 and the under-voltage detector 22 sense any abnormal values of current or voltage at the output of the switching regulator and provide signals to the fault shutdown circuit 19. When the fault shutdown circuit 19 receives a signal from any of the detectors 20, 21, and 22 it provides a signal to the rate generator which disables the rate generator and prevents any pulses from being supplied to trigger the switching regulator.

SWITCHING REGULATOR

As indicated in FIG. 1, switching regulator 11 includes a pair of transformers 25 and 26, each having a primary winding and a secondary winding. The primary windings 28 and 30 are connected in series and are coupled to the high voltage unregulated D.C. power supply having a positive output terminal 36 and a negative output terminal 37. A pair of silicon controlled rectifiers 33 and 34 control the current supplied by the power supply to the primary windings of transformers 25 and 26. The anode of silicon controlled rectifier 33 is connected to the positive terminal 36 of the unregulated D.C. power supply and the cathode of silicon controlled rectifier 33 is connected to the upper end of primary winding 28. The gate of silicon controlled rectifier 33 is connected to one lead of the trigger generator 14 which provides trigger signals to render rectifier 33 conductive. The anode of silicon controlled rectifier 34 is connected to the lower end of primary winding 30 and the cathode of silicon controlled rectifier 34 is connected to the negative terminal of the unregulated D.C. power supply. A second lead from the trigger regulator 14 is connected to the gate of silicon controlled rectifier 34 to provide trigger signals to render rectifier 34 conductive.

Figures 2, 3:
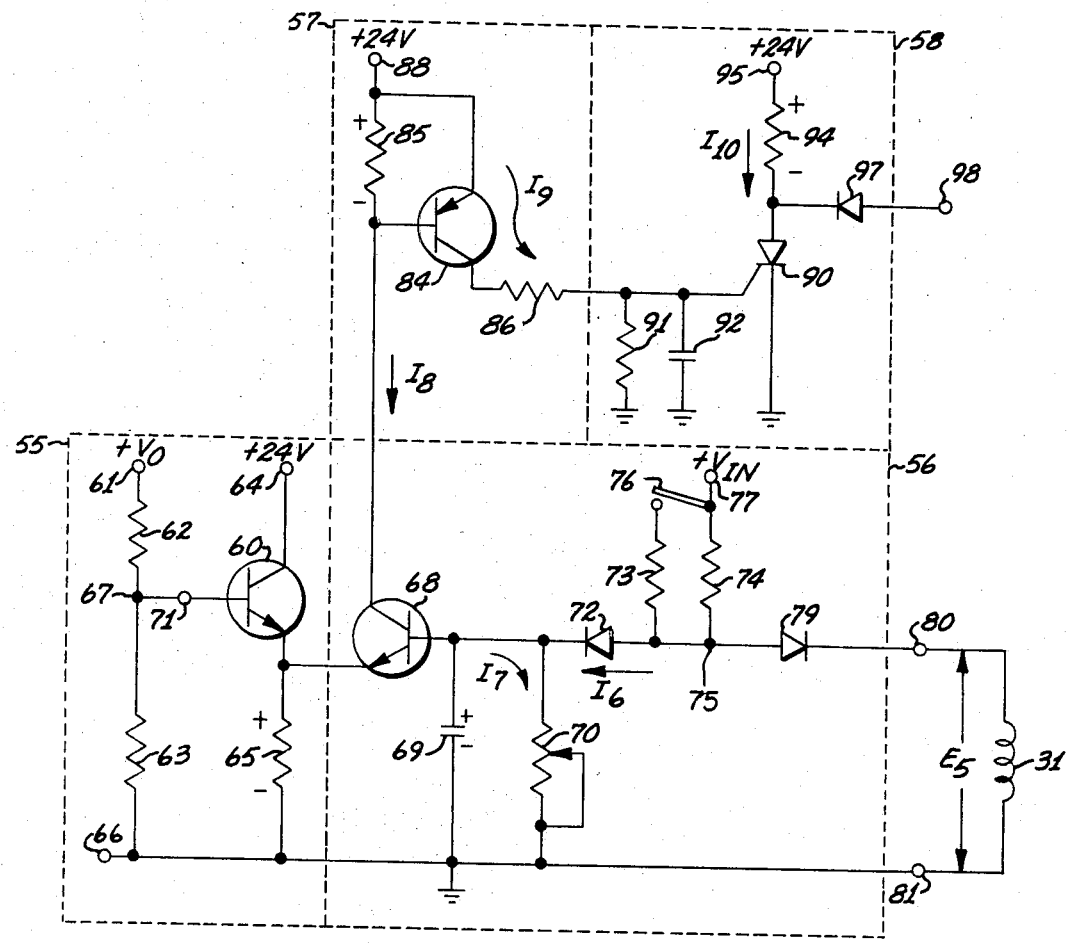
FIG. 2 is a schematic drawing of an embodiment of the instant invention.
FIG. 3 illustrates a magnetization curve which is useful in explaining the operation of the circuit shown in FIG. 1.

The magnetic core employed in transformers 25 and 26 produces the magnetization characteristics illustrated in the magnetization curve of FIG. 3. The magnetizing force H is equal to the product of the number of turns in a winding on the transformer core and the number of amperes of current for each turn of wire divided by the length of the core. Since the physical length of the particular transformer core is constant the magnetizing force of the transformer is often expressed as the number of amperes times the number of turns, or "ampere-turns." The flux density B is the number of lines of flux per square centimeter of the transformer core and is determined by the value of the magnetizing force and the type of material used in the core. A discussion of the magnetization curves can be found in the text book "Magnetic Circuits and Transformers" by E.E. Staff, M.I.T., 1943, published by John Wiley & Sons, New York, New York.

The operation of the circuit of FIG. 1 will now be discussed in connection with the magnetization curve shown in FIG. 3 and the waveforms shown in FIG. 4.

A pair of capacitors 40 and 41 provide predetermined quantities of electrical energy to the transformers 25 and 26 each time one of the silicon control rectifiers 33 and 34 is rendered conductive. Each time one of the silicon controlled rectifiers 33 and 34 is rendered non-conductive the same predetermined quantity of energy is delivered by one of the transformers 25 and 26 through diodes 43 and 44 to a filter capacitor 48. Prior to the time $t_1$ shown in FIG. 4, capacitor 40 of FIG. 1 is charged to the polarity shown in FIG. 1. At time $t_1$ a pulse of current from trigger generator 14 renders silicon control rectifier 33 conductive so that the voltage across the capacitor 40 is applied to the primary winding 28 of transformer 25 causing a current $I_1$ to flow from the upper plate of capacitor 40 through to anode to cathode of rectifier 33, through the primary winding 28 to the lower plate of capacitor 40. The current $I_1$ through primary winding 28 causes a change of flux in the transformer core and causes the operating point to move from point A toward point C of the magnetization curve in FIG. 3. This change in flux produces a voltage across primary winding 28, which limits the rate of increase in current through silicon controlled rectifier 33, thus preventing possible damage to rectifier 33. A positive voltage applied to the upper end of primary winding 28 causes the operating point to move upward from point C toward point D. The distance between point C and point D is proportional to the product of the voltage applied to primary winding 28 and the duration of time this voltage is applied.

The voltage applied to the primary winding 28 is magnetically coupled through the transformer core to the secondary winding 29. Between time $t_1$ and time $t_2$ secondary winding 29 has a positive polarity of voltage at the lower end of the winding and a negative polarity of voltage at the upper end of the winding. At this time, the voltage across the secondary winding 29 causes diode 43 to be back biased so that no current flows through the diode or through the secondary winding 28. Capacitor 40 provides current $I_1$ until this capacitor has discharged at time $t_2$ as shown in waveform $E_1$ of FIG. 4. The area M under the curve of waveform $E_1$ (FIG. 4) between time $t_1$ and $t_2$ is the sum of the products of the voltage applied to primary winding 28 and the duration of the time the voltage is applied and this area M represents the total energy stored in the core of transformer 25. When the voltage applied to primary winding 28 has a zero value at time $t_2$, the operating point on the magnetization curve of FIG. 3 reaches point D.

At time $t_2$, the energy stores in the core of transformer 25 reverses the polarity of voltage across each of the transformer windings so that negative polarity of voltage is developed at the upper end of primary winding 28. This negative polarity of voltage at the upper end of primary winding 28 causes the operating point in FIG. 3 to move from point D to point E and to begin moving toward point A. Again the distance between point E and point A is proportional to the product of the voltage across primary winding 28 and the duration of time this voltage is applied. The area N under the curve of waveform $E_1$ between times $t_2$ and $t_4$ is the sum of the products of voltage across primary winding 28 and the time this voltage is applied. In this area N represents a total energy which the core of transformer 28 returns through the transformer. The voltage across primary winding 28 causes current $I_1$ to charge capacitor 40 to a polarity opposite to the polarity shown in FIG. 1.

The energy in the core of transformer 25 causes the voltage across secondary winding 29 to increase to a value larger than the voltage across filter capacitor 48 so that a current $I_4$ flows through diode 43 to charge capacitor 48. The energy which is stored in the core of the transformer 25 when silicon controlled rectifier 33 conducts is proportional to the difference between the flux at point A and point D on the magnetization curve of FIG. 3; and the energy which is transferred to the secondary winding 29 when silicon controlled rectifier 33 is rendered non-conductive, is proportional to the difference between the flux at point E and point A.

Since the distance between point A through point C to point D shown in FIG. 3 is substantially the same as the distance between points E through point F to point A, substantially all of the energy which was stored in the core of the transformer between times $t_1$ and $t_2$ is returned and is stored in capacitors 48 and 49. Capacitor 40 delivers substantially the same amount of energy to the transformer each time the silicon controlled rectifier 33 is rendered conductive so that the amount of energy delivered to filter capacitors 48 and 49 and the voltage across these capacitors is determined by the frequency of the signals applied to the gate of rectifier 33.

Capacitor 41 also provides a predetermined quantity of energy to the transformer 26 each time silicon controlled rectifier 34 is rendered conductive. Prior to time $t_5$, capacitor 41 is charged to the polarity shown in FIG. 1. At time $t_5$ a pulse of current from the trigger generator 14 renders silicon controlled rectifier 34 conductive so that current $I_2$ flows from the upper plate of capacitor 41 through the primary winding 30, from anode to cathode of rectifier 34 to the lower plate of capacitor 41. Current $I_2$ through the primary winding and the voltages impressed across this winding cause the operating point of the characteristic curve in FIG. 3 to move from point A through point C to point D and causing a predetermined quantity of energy to be stored in the core of transformer 26. When silicon controlled rectifier 34 is rendered non-conductive, this energy is transferred through the secondary winding 31 causing a current $I_5$ to charge capacitor 48 as described above.

The amount of voltage across the capacitors 48 and 49 can be controlled by controlling the frequency of the trigger signals which trigger generator 14 applies to the gates of silicon controlled rectifiers 33 and 34. The frequency of the trigger signals is determined by the value of the current applied to the rate generator 15. When an increase in the amount of current drawn by a load (not shown) connected across the output terminals 51 and 52 in FIG. 1 causes the value of the output voltage to fall below a predetermined reference level, the frequency of the signals from trigger generator 14 increases. This increase in the frequency of the output signals causes an increase in the rate of energy delivered to filter capacitors 48 and 49 and increases the voltage at the output terminals 51 and 52 to the predetermined reference level. The voltage at the output terminal 51 of the power supply controls the frequency of the signals from the trigger generator 14 so that the voltage at the output terminals 51 and 52 is substantially constant even when the current drawn from this power supply varies over a wide range of values. A more detailed description of the operation of the switching regulator can be found in the U.S. Pat. No. 3,518,526 by Luther L. Genuit, issued June 30, 1970, entitled "Switching Regulator."

CURRENT-DETECTOR CIRCUIT

As indicated in FIG. 2, the circuit for detecting the value of current delivered by the switching regulator comprises a reference amplifier 55, a current monitor circuit 56, an amplifier 57 and a fault shut down circuit 58. The reference amplifier 55 includes a transistor 60 having a base, a collector and an emitter. A first reference voltage is applied to an input terminal 61 and applied to a voltage divider network comprising resistor 62 and 63. This voltage divider network provides a voltage at output terminal 71 which is less than the voltage at input terminal 61. In applications where it is desired that the maximum current from the switching regulator (FIG. 1) be determined by the output voltage from terminals 51 and 52 of FIG. 1, terminals 61 and 66 of the over-current detector of FIG. 2 are connected to terminals 51 and 52 respectively of the switching regulator shown in FIG. 1. When it is desired that the over-current detector have a constant value of maximum or threshold current, terminal 61 of the over-current detector is connected to a constant source of reference potential. Transistor 60 provides isolation between the junction point 67 and the emitter of the transistor 68 so that the reference voltage at junction point 67 does not change when the transistor 68 is rendered conductive.

A capacitor 69 and a rheostat 70 are connected in parallel between the base of transistor 68 and a reference potential, such as ground. A diode 72 is connected between the base of transistor 68 and resistor 74 which is connected to a terminal 77. Terminal 77 is connected to the positive output terminal 36 (FIG. 1) of the high voltage unregulated D.C. power supply so that the voltage applied to resistor 74 is the same as the voltage ($+V_{in}$) applied to the input terminals of the switching regulator. In some circuits the value of the voltage $+V_{in}$ may be larger than the voltage desired at terminal 77. In these circuits a voltage divider network may be used to reduce the value of the voltage applied to terminal 77. Another diode 79 is connected between the anode of diode 72 and the secondary 31 of transformer 26 (FIG. 1). The voltage applied to terminals 80 and 81 is the voltage which is developed across the secondary of transformer 26 in the switching regulator of FIG. 1.

The operation of the over-current detector circuit of FIG. 2 will now be discussed in connection with the switching regulator circuit shown in FIG. 1 and the waveforms shown in FIG. 4.

The current delivered to the output capacitors 48 and 49 (FIG. 1) by transformers 25 and 26 respectively are shown in waveforms $I_4$ and $I_5$ of FIG. 4. The average value of the current delivered by each of these transformers is approximately equal to ½ ($I_{max}$) X (duty cycle). The value of $I_{max}$ is determined by the value of the voltage, $+V_{in}$ at terminal 36. If the duty cycle is increased so that the pulses of current such as those shown at times $t_2$ and $t_{11}$ of waveform $I_4$ are closer together the average value of the current delivered to the output capacitors is increased. Thus, the duty cycle of the switching regulator and the value of the voltage $+V_{in}$ can be used to measure the value of current which is delivered by the switching regulator to the output filter capacitors. The duty cycle can be determined by using the voltage $E_5$ as a signal between terminals 80 and 81 of FIG. 2. Voltage $+V_{in}$ at terminal 77 is used to sense the value of current $I_{max}$.

Prior to the time $t_7$ (FIG. 4) the voltage across secondary winding 31 at terminal 80 (FIG. 2) has a value of zero so that the voltage at the junction point 75 has a low value of voltage. When junction point 75 has a low value of voltage capacitor 69 discharges through rheostat 70. At time $t_7$ the voltage at terminal 80 and the voltage at junction point 75 has a positive value so that a current $I_6$ flows from terminal 77 through resistor 74 and diode 72 to the upper plate of capacitor 69, thereby providing a charge on capacitor 69. The value of current $I_6$ is determined by the value of voltage $+V_{in}$ at terminal 77 and by the value of resistor 74. Due to the short duration of time between $t_7$ and $t_8$ capacitor 69 does not charge to the full value of voltage which is present at terminal 80. Between times $t_8$ and $t_{16}$ a current $I_7$ flows from the upper plate of capacitor 69 through rheostat 70 to the lower plate of capacitor 69, thereby partially discharging capacitor 69. When the duty cycle is small the time duration between time $t_8$ and time $t_{16}$ is relatively long so that capacitor 69 discharges for a relatively long time thereby removing most of the charge from capacitor 69. However, when the duty cycle increases, the time between $t_8$ and time $t_{16}$ is reduced so that capacitor 69 has a larger value of charge at the end of the discharge period of time. At time $t_{16}$ capacitor 69 again charges through resistor 74 and diode 72 to a greater value than it charged the previous time, due to the remaining charge on capacitor 69 at the start of the charging period. When the voltage across capacitor 69 reaches a value which is greater than the voltage across resistor 65, transistor 68 is rendered conductive. When transistor 68 is rendered conductive a current $I_8$ flows from terminal 88 through resistor 85, through transistor 68 and resistor 65 to ground.

Current $I_8$ through resistor 85 provides the potential shown across resistor 85 so that transistor 84 is rendered conductive. When transistor 84 is rendered conductive a current $I_9$ flows from terminal 88 through emitter to collector of transistor 85, through resistor 86, through gate to cathode junction of silicon controlled rectifier 90 to ground, thereby rendering silicon controlled rectifier 90 conductive. When silicon controlled rectifier 90 is rendered conductive a current $I_{10}$ flows from terminal 95 through resistor 94 and silicon controlled rectifier 90 to ground. Current $I_{10}$ provides a voltage drop across resistor 94 so that the voltage at the anode of the silicon controlled rectifier decreases. The decrease in voltage at the anode of rectifier 90 provides a low value of signal through diode 97 to the signal-output terminal 98. The signal at output terminal 98 is coupled to the rate generator 15 (FIG. 1) and causes the switching regulator to be disabled.

Capacitor 69 prevents the over-current detector from disabling the switching regulator when power is initially applied to the regulator so that the regulator can supply a relatively large current to charge the output filter capacitors. When power is initially applied to the switching regulator capacitor 69 is discharged. Capacitor 69 has a relatively large value, such as 22 microfards, so that several charge periods are required to increase the voltage across capacitor 69 from a value of zero to a value which will render transistor 68 conductive. During the time that capacitor 69 is charging transistor 68 is nonconductive so that transistor 84 and silicon controlled rectifier 90 are non conductive and the switching regulator will not be disabled by a signal from terminal 98. Thus, when power is initially applied to the regulator the duty cycle can be high and current to the output filter capacitors 48 and 49 (FIG. 1) can be high without causing the switching regulator to be disabled.

When a short occurs in the load at the output terminals of the switching regulator the output voltage, $+V_o$ decreases. This causes a decrease in the reference voltage at the base of transistor 60 and at the emitters of transistors 60 and 68 (FIG. 2). A relatively low value of voltage across capacitor 69 causes transistor 68 to be rendered conductive and to provide a signal which disables the switching regulator. Thus, the over-current detector protects the regulator from damage caused by short circuits in the load.

The over-current detector of FIG. 2 has a calibration circuit which includes resistor 73 and switch 76. In a typical circuit the value of resistor 73 may be 10 times the value of resistor 74. Switch 76 is closed while the circuit is being calibrated and the switch is open during normal operation of the switching regulator. When switch 76 is closed the current through resistor 73 is equal to 10 percent of the value of current flowing through resistor 74 when capacitor 69 is charging. This causes capacitor 69 to charge at a rate of 10 percent faster than when switch 76 is open. To calibrate the over-current detector a load which draws a desired normal value of current is placed across terminals 51 and 52 of the switching regulator of FIG. 1 and switch 76 is closed. The value of rheostat 70 is slowly increased from a low value until a disable signal is produced at terminal 98 of FIG. 2. When switch 76 is open an output current of 10 percent above normal value must be drawn from the switching regulator and a duty cycle of 10 percent above normal produced to provide the extra time for capacitor 69 to charge enough to render transistor 68 conductive and disable the switching regulator. Other ratios of values of resistors 73 and 74 can be used to obtain different threshold values of output currents from the switching regulator.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are therefore intended to cover and embrace any such modifications, within the limits only of the true spirit and scope of the invention.

I claim:

1. An over-current detector for use with a switching regulator which includes a transformer having a primary winding and a secondary winding, said detector comprising:

a first transistor having a base, a collector and an emitter;

first, second, third and fourth reference potentials;

first, second and third resistors, said first resistor being connected between said first potential and said collector of said first transistor, said second resistor being connected between said second potential and said base of said first transistor;

first and second diodes each having an anode and a cathode, said cathode of said first diode being connected to said base of said first transistor, said third resistor being connected between said third potential and said anode of said first diode, said anode of said second diode being connected to said anode of said first diode, said secondary of said transformer being connected between said second potential and said cathode of said second diode;

a capacitor, said capacitor being connected between said second potential and said base of said first transistor;

said fourth potential being coupled to said emitter of said first transistor; and an output lead, said output lead being coupled to said collector of said first transistor;

2. An over-current detector as defined in claim 1, including:
a second transistor having a base, a collector and an emitter; and
a fourth resistor, said fourth resistor being connected between said second potential and said emitters of said first and said second transistors, said base of said second transistor being coupled to said fourth potential, said collector of said second transistor being connected to said first potential.

3. An over-current detector as defined in claim 2, including:
a third transistor having a base, a collector and an emitter, said base of said third transistor being connected to said output lead, said emitter of said third transistor being connected to said first potential;
a controlled rectifier having an anode, a cathode and a gate, said gate of said rectifier being coupled to said collector of said third transistor, said cathode of said rectifier being connected to said second potential;
a fifth resistor, said fifth resistor being connected between said first potential and said anode of said rectifier; and
a signal-output terminal, said signal-output terminal being coupled to said anode of said rectifier.

4. An over-current detector for use with a switching regulator which includes first and second voltage-output terminals and a transformer having a secondary winding, said detector comprising:
first and second transistors each having a base, a collector and an emitter;
first, second and third reference potentials;
first, second, third and fourth resistors, said first resistor being connected between said first potential and said collector of said first transistor, said second resistor being connected between said second potential and said base of said first transistor;
a voltage divider network having first and second input terminals and an output terminal, said first input terminal of said network being connected to said first output terminal of said regulator, said second input terminal of said network being connected to said second output terminal of said regulator, said output terminal of said network being connected to said base of said second transistor, said second output terminal of said regulator being connected to said second potential;
first and second diodes each having an anode and a cathode, said cathode of said first diode being connected to said base of said first transistor, said third resistor being connected between said third potential and said anode of said first diode, said anode of said second diode being connected to said anode of said first diode, said secondary of said transformer being connected between said second potential and said cathode of said second diode;
a capacitor, said capacitor being connected between said second potential and said base of said first transistor, said fourth resistor being connected between said second potential and said emitters of said first and said second transistors, said collector of said second transistor being connected to said first potential; and
an output lead, said output lead being coupled to said collector of said first transistor.

5. An over-current detector as defined in claim 4 including:
a third transistor having a base, a collector and an emitter, said base of said third transistor being connected to said output lead, said emitter of said third transistor being connected to said first potential;
a controlled rectifier having an anode, a cathode and a gate, said gate of said rectifier being coupled to said collector of said third transistor, said cathode of said rectifier being connected to said second potential;
a fifth resistor, said fifth resistor being connected between said first potential and said anode of said rectifier; and
a signal output-terminal, said signal-output terminal being coupled to said anode of said rectifier.

6. An over-current detector as defined in claim 4, including:
a switch having first and second terminals;
fifth and sixth resistors, said first terminal of said switch being connected to said third potential, said sixth resistor being connected between said second terminal of said switch and said anode of said first diode;
a third transistor having a base, a collector and an emitter, said base of said third transistor being connected to said output lead, said emitter of said third transistor being connected to said first potential;
a controlled rectifier having an anode, a cathode and a gate, said gate of said rectifier being coupled to said collector of said third transistor, said cathode of said rectifier being connected to said second potential, said fifth resistor being connected between said first potential and said anode of said rectifier; and
a signal-output terminal, said signal-output terminal being coupled to said anode of said rectifier.

7. An over-current detector for use with a switching regulator which includes first and second voltage-input terminals, first and second voltage-output terminals and a transformer having a secondary winding, said detector comprising:
first and second transistors each having a base, a collector and an emitter;
first and second reference potentials, said collector of said second transistor being connected to said first potential;
a voltage divider network having first and second input terminals and an output terminal, said first input terminal of said network being connected to said first output terminal of said regulator, said second input terminal of said network being connected to said second output terminal of said regulator and to said second input terminal of said regulator, said output terminal of said network being connected to said base of said second transistor, said second output terminal of said regulator being connected to said second potential;
first, second, third and fourth resistors, said first resistor being connected between said first potential and the said collector of said first transistor, said second resistor being connected between said second potential and said base of said first transistor;
first and second diodes each having an anode and a cathode, said cathode of said first diode being connected to said base of said first transistor, said third resistor being connected between said anode of said first diode and said first input terminal of said switching regulator, said anode of said second diode being connected to said anode of said first diode, said secondary winding of said transformer being connected between said second potential and said cathode of said second diode;
a capacitor, said capacitor being connected between said second potential and said base of said first transistor, said fourth resistor being connected between said second potential and said emitters of said first and said second transistors; and an output lead, said output lead being coupled to said collector of said first transistor.

8. An over-current detector as defined in claim 7 including:
a third transistor having a base, a collector and an emitter, said base of said third transistor being connected to said output lead, said emitter of said third transistor being connected to said first potential;
a controlled rectifier having an anode, a cathode and a gate, said gate of said rectifier being coupled to said collector of said third transistor, said cathode of said rectifier being connected to said second potential;
a fifth resistor, said fifth resistor being connected between said first potential and said anode of said rectifier; and
a signal-output terminal, said signal-output terminal being coupled to said anode of said rectifier.

9. An over-current detector as defined in claim 7 including:
a switch having first and second terminals; and
a sixth resistor, said first terminal of said switch being connected to said first input terminal of said regulator, said sixth resistor being connected between second terminal of said switch and said anode of said first diode.

10. An over-current detector as defined in claim 7 including:
a switch having first and second terminals;
fifth and sixth resistors, said first terminal of said switch being connected to said first input terminal of said regulator, said sixth resistor being connected between said second terminal of said switch and said anode of said first diode;
a third transistor having a base, a collector and an emitter, said base of said third transistor being connected to said output lead, said emitter of said third transistor being connected to said first potential;
a controlled rectifier having an anode, a cathode and a gate, said gate of said rectifier being coupled to said collector of said third transistor, said cathode of said rectifier being connected to said second potential, said fifth resistor being connected between said first potential and said anode of said rectifier; and
a signal-output terminal, said signal-output terminal being coupled to said anode of said rectifier.

* * * * *